(12) United States Patent
Behymer et al.

(10) Patent No.: US 7,114,610 B2
(45) Date of Patent: Oct. 3, 2006

(54) CONVEYOR BELT CLEANING SYSTEM

(75) Inventors: Lance E. Behymer, Woodbury, MN (US); Smarajit Mitra, West Saint Paul, MN (US); Jerald W. Hall, Jr., Woodbury, MN (US); Alexander C. Tsuei, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 249 days.

(21) Appl. No.: 10/850,323

(22) Filed: May 20, 2004

(65) Prior Publication Data

US 2005/0006204 A1 Jan. 13, 2005

Related U.S. Application Data

(63) Continuation-in-part of application No. 10/309,790, filed on Dec. 4, 2002.

(51) Int. Cl.
*B65G 45/12* (2006.01)

(52) U.S. Cl. .................. 198/497; 198/494; 198/495; 15/256.51

(58) Field of Classification Search ............... 198/493, 198/494, 495, 496, 497; 15/256.5, 256.51
See application file for complete search history.

(56) References Cited

U.S. PATENT DOCUMENTS

| | | | |
|---|---|---|---|
| 669,821 A | 3/1901 | Derdeyn | |
| 1,165,404 A | 12/1915 | Harrington | |
| 2,083,864 A | 6/1937 | Puckett | |
| 2,512,073 A | 6/1950 | Sandberg | |
| 2,730,770 A | 1/1956 | Higginbotham et al. | |
| 2,858,576 A | 11/1958 | Rose | |
| 3,047,133 A | 7/1962 | Searles | |
| 3,430,758 A | 3/1969 | Searles | |
| 3,656,200 A | 4/1972 | Riley, Jr. | |
| 3,875,613 A | 4/1975 | Pincus | |
| 3,948,383 A | 4/1976 | Morissette | |
| 3,952,654 A * | 4/1976 | Evans | 15/256.51 |
| 4,054,404 A | 10/1977 | Marsh | |
| 4,072,092 A | 2/1978 | Kohli | |
| 4,218,131 A | 8/1980 | Ito et al. | |
| 4,272,184 A | 6/1981 | Rezanka | |
| 4,286,039 A | 8/1981 | Landa et al. | |
| 4,395,113 A | 7/1983 | Buchan et al. | |
| 4,407,219 A * | 10/1983 | Dellevoet | 15/256.51 |
| 4,412,736 A | 11/1983 | Sakamoto et al. | |
| 4,515,467 A | 5/1985 | Suzuki | |
| 4,533,235 A | 8/1985 | Uchida | |
| 4,664,719 A | 5/1987 | Mizutani | |
| 4,757,763 A * | 7/1988 | MacPhee et al. | 15/256.51 |
| 4,907,690 A | 3/1990 | Spohn | |
| 4,934,513 A | 6/1990 | Kirkpatrick et al. | |
| 4,976,342 A * | 12/1990 | Hwang | 198/495 |
| 4,990,962 A | 2/1991 | Kishi | |
| 5,005,861 A | 4/1991 | Breed et al. | |
| 5,034,778 A | 7/1991 | Levanon et al. | |
| 5,117,967 A | 6/1992 | Morrow et al. | |
| 5,225,853 A | 7/1993 | Kobayashi et al. | |
| 5,251,348 A | 10/1993 | Corrado et al. | |
| 5,332,642 A | 7/1994 | Simms et al. | |
| 5,338,340 A | 8/1994 | Kasmark, Jr. et al. | |

(Continued)

FOREIGN PATENT DOCUMENTS

GB 2082133 A 3/1982

(Continued)

*Primary Examiner*—James R. Bidwell
(74) *Attorney, Agent, or Firm*—Stephen W. Buckingham

(57) ABSTRACT

An assembly and method for cleaning a conveyor belt system is disclosed. The cleaning assembly is for removing liquids and solids from an endless conveyor belt, the assembly includes a plurality of laterally extending liquid absorbent material sheets disposed adjacent the belt, with the sheets collectively defining a contact face that is engageable with the belt for wiping liquids from the belt.

21 Claims, 9 Drawing Sheets

U.S. PATENT DOCUMENTS

| | | |
|---|---|---|
| 5,400,897 A | 3/1995 | Doyle |
| 5,493,369 A | 2/1996 | Sypula et al. |
| 5,497,872 A | 3/1996 | Pennino |
| 5,530,537 A | 6/1996 | Thayer |
| 5,534,063 A | 7/1996 | Maruyama et al. |
| 5,638,842 A | 6/1997 | Tokita et al. |
| 5,640,655 A | 6/1997 | Shoji |
| 5,647,907 A * | 7/1997 | van der Meulen ......... 15/256.5 |
| 5,699,584 A * | 12/1997 | Wieloch et al. .......... 15/256.52 |
| 5,705,447 A | 1/1998 | Kubo |
| 5,737,796 A | 4/1998 | Sendzimir et al. |
| 5,737,846 A | 4/1998 | Warren et al. |
| 5,752,144 A | 5/1998 | Mammino et al. |
| 5,758,237 A | 5/1998 | Abramsohn |
| 5,774,177 A | 6/1998 | Lane |
| 5,856,245 A | 1/1999 | Caldwell |
| 5,873,014 A | 2/1999 | Knapp et al. |
| 5,874,164 A | 2/1999 | Caldwell |
| 5,912,116 A | 6/1999 | Caldwell |
| 5,931,971 A | 8/1999 | Zucker |
| 6,006,062 A | 12/1999 | Takahashi et al. |
| 6,040,251 A | 3/2000 | Caldwell |
| 6,083,602 A | 7/2000 | Caldwell |
| 6,149,781 A | 11/2000 | Forand |
| 6,223,008 B1 | 4/2001 | Takahashi et al. |
| 6,270,893 B1 | 8/2001 | Young et al. |
| 6,357,350 B1 | 3/2002 | Kerr |
| 6,411,785 B1 | 6/2002 | Ogawahara et al. |
| 6,508,602 B1 | 1/2003 | Gruenbacher et al. |
| 6,529,700 B1 | 3/2003 | Nukada et al. |
| 6,530,658 B1 | 3/2003 | Pham |
| 6,643,478 B1 | 11/2003 | Okano |
| 6,679,601 B1 | 1/2004 | Pham et al. |
| 2002/0017310 A1 | 2/2002 | Gruenbacher et al. |
| 2002/0155772 A1 | 10/2002 | Wong et al. |

FOREIGN PATENT DOCUMENTS

| | | |
|---|---|---|
| WO | WO 96/36757 | 11/1996 |
| WO | WO 00/17436 | 3/2000 |
| WO | WO 01/26499 | 4/2001 |
| WO | WO 01/26528 | 4/2001 |
| WO | WO 01/26530 | 4/2001 |
| WO | WO 01/27239 | 4/2001 |
| WO | WO 01/265527 | 4/2001 |
| WO | WO 02/36339 | 10/2002 |

* cited by examiner

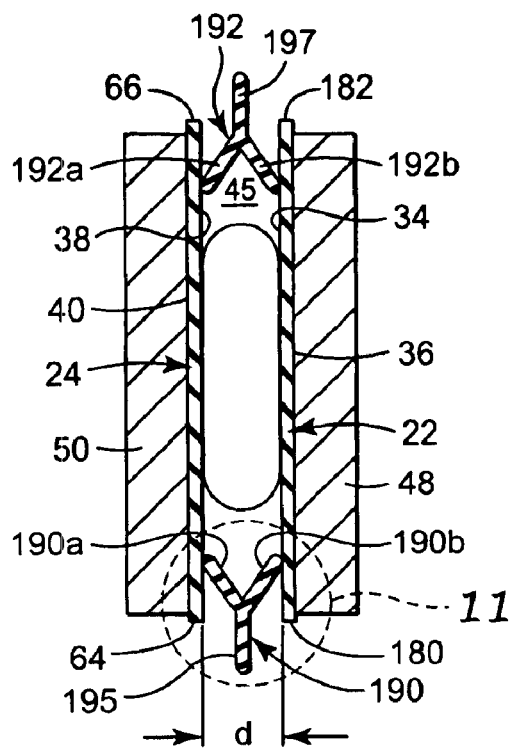
FIG. 1A
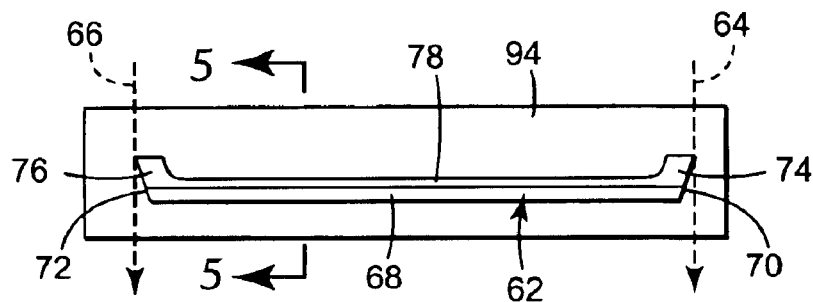
FIG. 2
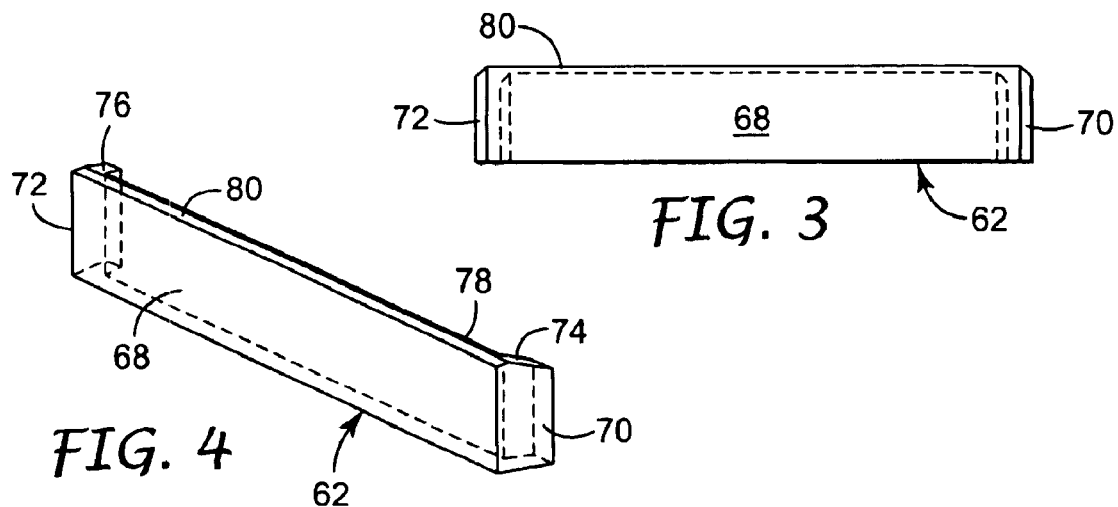
FIG. 3
FIG. 4

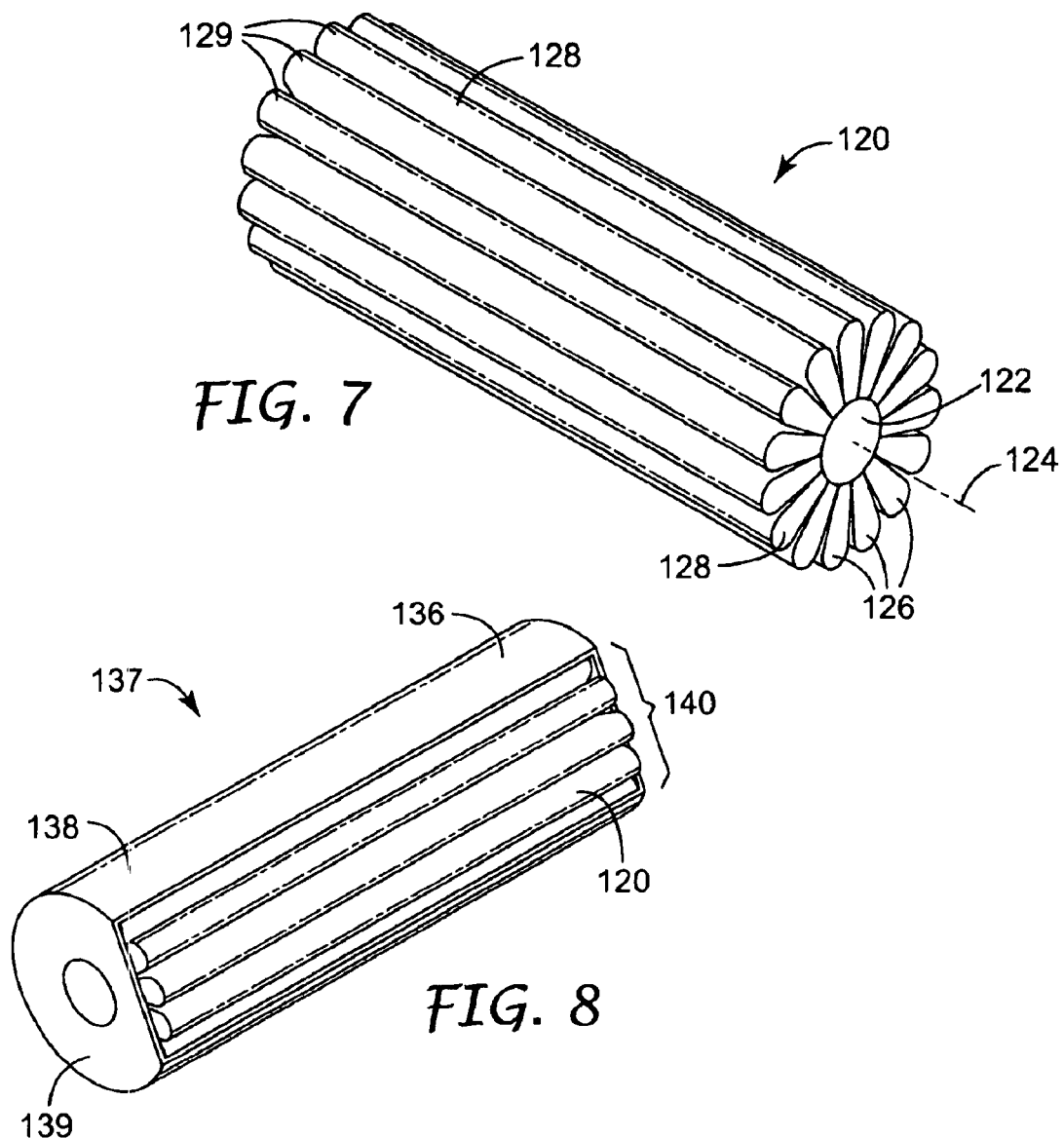
FIG. 7
FIG. 8
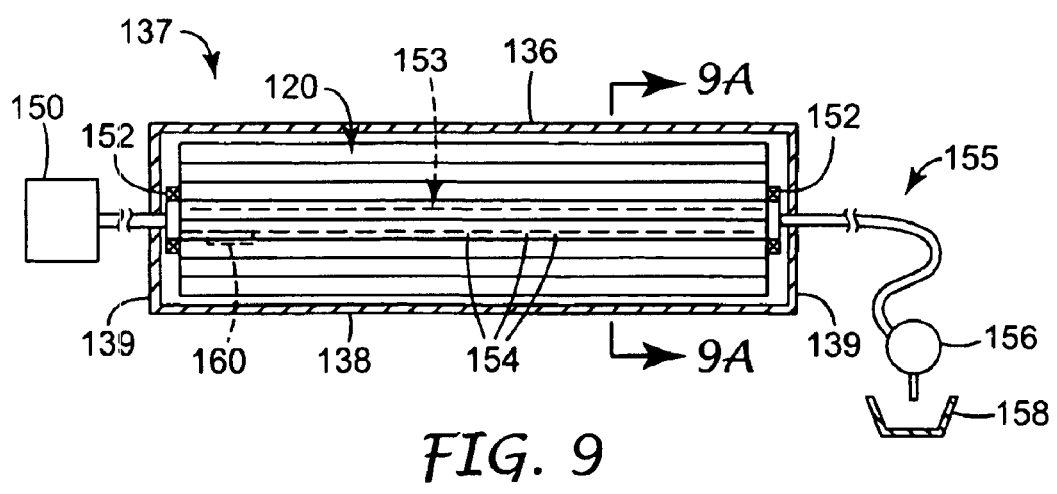
FIG. 9

CONVEYOR BELT CLEANING SYSTEM

CROSS-REFERENCE TO RELATED APPLICATION(S)

This application is a continuation-in-part of application Ser. No. 10/309,790, filed Dec. 4, 2002, which is hereby incorporated by reference in its entirety.

BACKGROUND OF THE INVENTION

The present invention is directed to a system for cleaning conveyor belts, and particularly to a cleaning assembly for dual conveyor belt systems.

A conveyor system employing an endless belt may, over time, require cleaning of the belt surface. This is particularly true when the belt is used for conveying an article during processing of the article where portions of the article, in one form or another, are transformed. Such transformations may be accomplished by, for example, applying pressure or heat to the article being conveyed.

One form of such a conveying system employs two endless belts. Each belt traverses a separate belt travel path, with the two belt travel paths together defining an article transport path between opposed faces of the belts. The article being conveyed, upon entry into the article transport path, is simultaneously engaged by the opposed faces of the two belts as it moves along an article processing path. One specific example of such a process is a cooking process, where the article being conveyed is a food item which is cooked while simultaneously being conveyed by the conveyor belt system. In an article cooking application, heat may be applied to the article as it is conveyed by the two belts along the article transport path defined by the belts.

As the article is heated, fluids in the article may leave the article in liquid form (i.e., water or oils) or in gas form (i.e., steam or vapor). In addition, portions of the article may separate from the article during processing, causing debris to remain on the belt once the article has left the article transport path. As the endless belts operate over time to transport a plurality of articles, the build up of liquids and debris on the belts can become significant, affecting the performance of the belts in processing the article. In addition, the migration of fluids and/or debris into the operating equipment for the belts and other associated processing equipment can degrade the performance of such equipment. Therefore, it is desirable that any debris or excess liquids created on the belt during processing be removed from the belt in an efficient and expeditious manner.

BRIEF SUMMARY OF THE INVENTION

In one embodiment, the present invention is an assembly for removing liquids and solids from an endless conveyor belt. The assembly includes a plurality of laterally extending liquid absorbent material sheets disposed adjacent the belt, with the sheets collectively defining a contact face that is engageable with the belt for wiping liquids from the belt.

In another embodiment, the cleaning assembly includes a liquid absorbent material unit disposed adjacent the belt. The absorbent material unit comprises a stack of laterally extending sheets of absorbent material affixed together at first edges of each of the sheets, and at opposite second edges the sheets collectively define a contact face on the absorbent material unit that is engageable with the belt for wiping liquids and solids from the belt. Also, at least one of the sheets deflects when engaged with the belt.

In another embodiment, the present invention is a method for removing liquids and solids from an endless conveyor belt. The method includes advancing the belt, and engaging the belt with a contact face of a liquid absorbent material unit disposed adjacent the belt. The absorbent material unit comprises a stack of laterally extending sheets of absorbent material affixed together at first edges of each of the sheets, and at opposite second edges the sheets collectively define the contact face of the absorbent material unit. At least one of the sheets deflects when engaged with the belt.

BRIEF DESCRIPTION OF THE DRAWINGS

The present invention will be further explained with reference to the drawing figures listed below, wherein like structures are referred to by like numerals throughout the several views.

FIG. 1A is a sectional view as taken along lines 1A—1A in FIG. 1, showing a pair of belt seals between opposed faces of the belts along an article transport path defined by and between the belts.

FIG. 2 is a plan view, as viewed from the article conveying belt face, of a belt cleaning blade assembly of the present invention.

FIG. 3 is a view of the blade of FIG. 2, as viewed from the downstream side of the belt.

FIG. 4 is a perspective view of the blade of FIG. 2.

FIG. 7 is a perspective view of an exemplary absorbent material pad which is disposed for contact with the belt face downstream from the wiper blade.

FIG. 8 is a perspective view of the absorbent material pad disposed in a pad holding housing, having a pad exposing window therein.

FIG. 9 is a sectional view through the housing of FIG. 7, schematically showing an alternative motor and/or liquid collection system connected thereto.

While the above-identified drawing figures set forth several embodiments of the invention, other embodiments are also contemplated, as noted in the discussion. In all cases, this disclosure presents the present invention by way of representation and not limitation. It should be understood that numerous other modifications and embodiments can be devised by those skilled in the art which fall within the spirit and scope of the principles of this invention.

DETAILED DESCRIPTION

Figure 1:
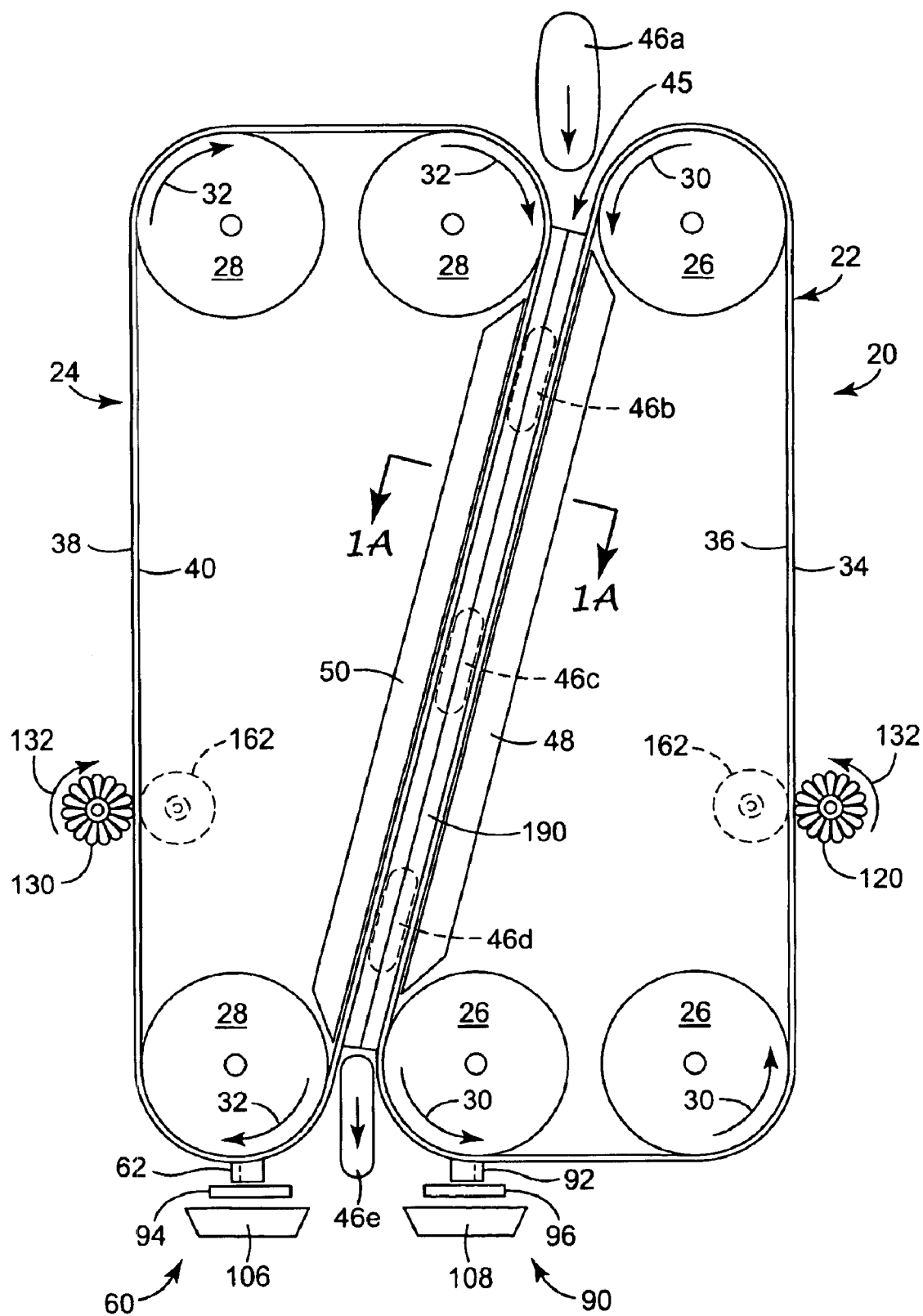
FIG. 1 is a schematic illustration of a conveyor belt system having the inventive cleaning assembly thereon.
Figure 5:
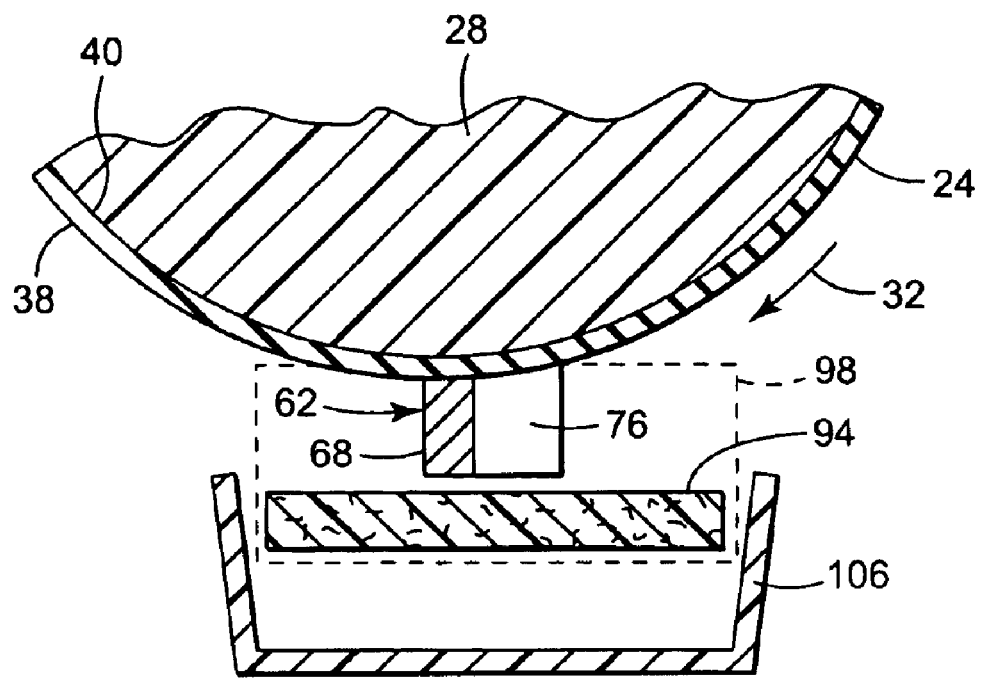
FIG. 5 is a sectional view, as taken along lines 5—5 in FIG. 2.

FIG. 1 illustrates an article conveying system 20 including the cleaning assembly components of the present invention. The conveying system 20 has first and second endless belts 22 and 24. Each belt is supported by a plurality of rollers such as rollers 26 for belt 22 and rollers 28 for belt 24. The rollers define a separate belt travel path for each belt, and at least one of the rollers 26 and 28 for each belt is driven to move that belt along its respective belt travel path. Arrows 30 indicate the direction of movement of belt 22, while arrows 32 indicate the direction of movement of belt 24. Typically, the belts are driven to move at the same rate, although not necessarily.

Each belt has a top face for engaging an article being conveyed by the belt, and an opposite bottom face for engaging its respective rollers. Accordingly, first belt 22 has a top face 34 and a bottom face 36, and second belt 24 has a top face 38 and a bottom face 40.

The first and second endless belts 22 and 24 together define an article transport path 45 between opposed top faces 34 and 38 of the belts 22 and 24, respectively. The article transport path 45 generally consists of the space between the opposed top faces of the belts (see space "d" in FIG. 1A), and extends longitudinally for so long as the top faces are opposed, and extends laterally to adjacent the lateral side edges of the belts. An article to be conveyed, such as article 46a, is introduced at a first end of the article transport path 45, is carried between the opposed top faces of the belts (as indicated by articles 46b, 46c and 46d illustrated in phantom in FIG. 1) and exits the article transport path 45 adjacent a second end thereof (as illustrated by processed article 46e). The article transport path 45 may be linear, as illustrated in FIG. 1, or may include one or more curves, as necessitated by the particular processing being conducted. In addition, the spacing "d" across the article transport path between opposed top faces of the belts may vary. For instance, the article transport path may be wider in spacing adjacent its first end than adjacent its second end. In the illustrated embodiment, the article transport path 45 is a generally upright transport path, with its first end higher than its second end.

In some applications (e.g., cooking), it may be desired to present a heated conveying surface to the article 46. In that situation, heating elements, such as heater 48 and 50 may be provided to heat the first and second belts 22 and 24 along the article transport path 45.

The endless belts 22 and 24 may be formed from a material that has the sufficient flexibility to traverse its belt travel path and has other desired characteristics, such as a particular frictional characteristic relative to the article being transported and its respective support rollers, and if heating is to be applied to the article, desired thermal characteristics. In one embodiment, the belt may be constructed from a nickel iron alloy known as Invar™ available from Imphy S.A. Corp., Paris, France. The faces of the belt may also be coated with desired materials, either to control frictional, thermal or other characteristics. Examples of coatings for the top face of the belt are the Excalibur™ coating available from Whitford Corporation, West Chester, Pa. and the Teflon™ coating available from E.I. du Pont de Nemours and Company, Wilmington, Del. While FIG. 1 illustrates heating the article as it traverses the article transport path 45, other manipulation or treatment of the article is also possible, including, for example, the application of pressure and/or the introduction of other components onto the article (e.g., coatings, flavorings, etc.)

During use, debris and liquid may be deposited on the top faces 34 and 38 of the belts 22 and 24. Such debris typically comes from the article being processed, either in the form of article breakage or the extraction of liquids or gases therefrom during processing. The presence of debris and excess liquids on the belts 22 and 24 can degrade performance of the conveying system 20 by, for example, adversely affecting the frictional and/or thermal properties of the belt with respect to the article being transported. In addition, such debris and liquids may also interfere with the engagement of a belt and its respective support rollers, and with other associated processing equipment. Conveying systems such as those illustrated in FIG. 1 are typically employed in highly automated and high product throughput processing systems. Accordingly, extensive downtime of the system for the purpose of cleaning the belts is unacceptable. Such downtime not only inhibits the production of processed articles, but also may be rather labor intensive. Additional handling of the system components also may increase the possibility of damage to the belt, its associated rollers and other equipment components during cleaning and/or removal of a belt for cleaning.

The present invention provides a belt cleaning system which effectively cleans the belt during conveying operations, thereby avoiding the necessity for a system shutdown of undesirable duration for belt cleaning. The inventive system may include a belt wiping blade, absorbent belt wiping pad and belt edge containment seals. These components capture debris and liquids on the top face of each belt, remove it from the belt and/or direct it away from the edges and bottom face of the belt (where it could come into engagement with the support rollers and other equipment (e.g., heaters)).

Belt Wiping Blade Assembly

A belt wiping blade assembly 60 is illustrated in cooperation with the second belt 24 in FIG. 1. The belt wiping blade assembly 60 includes a blade 62 engaging and extending across the top face 38 of the second belt 24. Opposite the blade 62, the belt 24 is supported relative to the blade 62 by one of the rollers 28. The blade 62 is held in place by suitable structure (not shown) which may include means for selectively moving the blade 62 toward and away from the belt 24. The blade 62 is disposed adjacent a lowest extent of the travel path of the belt 24, and in one embodiment, is disposed slightly upstream from that lowest extent, which causes the waste and debris engaged by the blade 62 to be removed from the belt 24 before its natural drop point.

The shape of the blade 62 in one embodiment is illustrated more fully in FIGS. 2–6. FIG. 2 illustrates the blade in plan view, as viewed from the top face 38 of the belt 24 engaging the blade 62. In FIG. 2, lateral side edges 64 and 66 of the belt 24 are illustrated in phantom. The blade 62 has an elongated central section 68 and lateral end edges 70 and 72. Each end edge has a diversion ramp 74, 76, respectively, projecting upstream relative to belt movement past the blade 62. Each diversion ramp 74 and 76 extends outwardly from the central section 68 of the blade 62 at an obtuse angle. An upper edge of the blade may be configured to accommodate the belt face it engages. For instance, each of the diversion ramps 74 and 76 may have an arced surface adjacent an upper edge 78 of the blade, and/or a portion of the upper edge 78 of the elongated section 68 of the blade 62 may include a radius (see e.g., radius portion 80 along the upper edge 78 of the blade 62). Accordingly, the blade 62 extends across the entire lateral width of the belt 24, and any debris and excess liquid disposed on the top face 38 of the belt 24 is diverted off of the belt 24 by the blade 62. The diversion ramps 74 and 76 serve to direct debris and liquids away from the lateral side edges 64 and 66 of the belt 24.

In one embodiment, the blade is formed from a fluoroelastomer rubber such as Viton™ material available from E. I. du Pont de Nemours and Company, Wilmington, Del. The blade is softer than the belt surface which it engages so that the blade does not scratch the belt as the belt traverses its travel path past the stationary blade. The surfaces of the blade contacting the belt are smooth, the blade is generally stiff and resilient, and the blade does not absorb or exhibit an affinity for any particular form of liquid. In addition, it is important that the blade have a melt temperature higher than the possible temperature of the belt. In one embodiment, the blade has a melt temperature higher than 350° F. (177° C.), preferably higher than 400° F. (204° C.), and more preferably higher than 450° F. (232° C.).

In one embodiment, a belt wiping blade assembly is provided for each of the belts 22 and 24. The belt wiping blade assembly 60 described above is disclosed with respect to the second belt 24, while another belt wiping blade assembly 90 provided for the first belt 22, as seen in FIG. 1. The belt wiping blade assembly 90 has a blade 92, which in all regards is the same as the blade 62. The belt wiping blade assemblies are identically oriented with respect to their respective belts, although the orientations are mirror images of one another, as seen in FIG. 1.

In each belt wiping blade assembly, a filter or screen is disposed below the blade. Debris and liquid removed from the belt by the blade is directed onto the filter. Liquid flows through the filter, while debris is collected on and in the filter for disposal. The belt wiping blade assembly 60 has a filter 94 disposed below the blade 62, while the belt wiping blade assembly 90 has a filter 96 disposed between the blade 92 (see FIGS. 1 and 5). The filters 94 and 96 may be formed from a layer of scrim material or nonwoven material, for example, with voids allowing liquid to flow through and a mat or sheet of fibers which stop the flow of debris and other particulate matter therethrough. For example, a woven fiberglass or polyester scrim or nonwoven polymeric fibers may suffice as the filter. The filters 94 and 96 are supported by suitable structure (not shown in FIGS. 1 and 5) under their respective blades 62 and 92.

Figure 6:
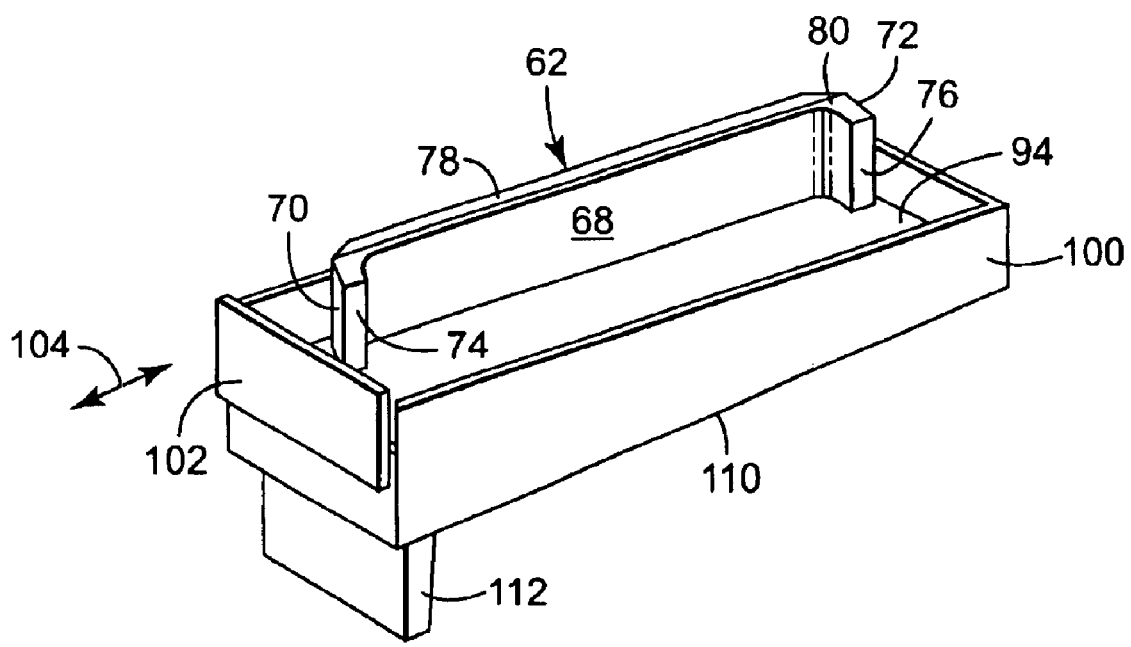
FIG. 6 is a perspective view of the blade of FIG. 2, and its associated filter and liquid collector.

As the blade becomes soiled or damaged in use, it may be removed for cleaning or replacement independently of its respective filter. Alternatively, the blade and filter may be connected in cartridge form (as indicated schematically by phantom cartridge 98 in FIG. 5) for joint removal (for cleaning or replacement) relative to their respective belt. FIG. 6 illustrates an embodiment wherein the filter 94 is laterally slideably received in a housing 100, and has an endplate 102 connected thereto for facilitating slideable removal of the filter 94 relative to the housing 100, as indicated by arrows 104. The filter 94 is thus replaceable without removal of the blade 62 thereabove.

A liquid collector is disposed under the filter of each belt wiping blade assembly to collect liquid removed from the top face of the belt by the blade and run through its filter. The liquid collector can be a trough, or a diverter tray with a drain and conduits leading to a liquid collection reservoir at some remote location (not shown). FIG. 1 illustrates the liquid collectors as troughs 106 and 108 of the belt wiping blade assembly 60 and 90, respectively. In FIG. 6, the trough 106 for the belt wiping blade assembly 60 is shown with a sloped bottom 110, tilting downwardly from one lateral side edge of the belt 24 to the other side edge, with a drain conduit 112 at the lowest end of the sloped bottom 110. The liquid collectors 106 and 108 are supported relative to the respective belts, blades and filters by suitable structure (not shown). If the liquid collector is not provided with a drain, it must be accessible and removable for cleaning and disposal of any liquid therein.

Absorbent Pad Assembly

In spite of the fact that each belt has a blade wiping against it for liquid and debris removal, not all liquids and solids may be removed from a belt by its respective blade. Accordingly, an absorbent material can be brought into engagement with the top face of each belt downstream from the blade for further removal of liquids and solids from the belt. The absorbent material urged into contact with the top face of the belt to wick off and further to wipe off liquids and solids borne by the belt.

Figure 9A:
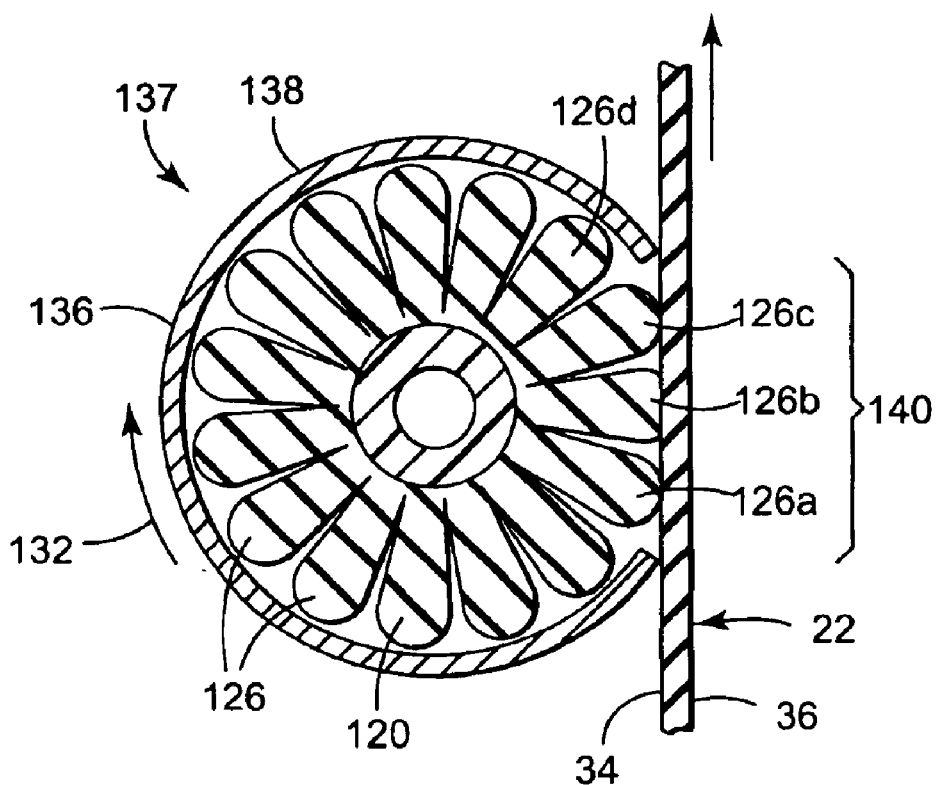
FIG. 9A is an enlarged longitudinal section through an absorbent material pad cartridge and its associated belt, aligned for engagement and operation.

FIG. 7 illustrates an exemplary design for an absorbent pad 120. A core 122 extending along a central axis 124 has a plurality of lobes 126 of absorbent material 128 affixed thereto so that the lobes 126 radiate outwardly therefrom. Outer edges 129 of the lobes 126 cooperatively define the absorbent pad 120 as a generally cylindrical pad assembly. In use, as seen in FIG. 9A, an arced segment of the cylindrical pad assembly is brought into contact with the top face of one of the belts, to define a contact face of the absorbent pad. Although disclosed as a generally cylindrically shaped absorbent pad 120, the absorbent material 128 can take other forms. For example, the absorbent material can be a static pad (see, e.g., FIG. 12) or could be disposed as a belt (endless or running end to end) which can have an arced portion thereof brought into contact with the top face of the belt to be cleaned.

The absorbent material is flexible, and may be formed from a nonwoven material, a woven material, a knit material, or combinations thereof. Suitable materials include polyethylene, polypropylene, polyolefins, polyesters and nylons. In one embodiment, the absorbent material has certain desired absorbency characteristics, such as being oleophilic, hydrophilic, or combinations thereof. The absorbent material must also be softer than the belt face against which it is engaged, so that the belt face is not scratched or otherwise abraded during the cleaning process. Further, the absorbent material should be nonshedding of fibers so that it does not itself contaminate the belt with debris (and likewise does not contaminate articles conveyed by the belt, a significant concern when the articles are food items). In one embodiment, a scrim is disposed between the absorbent material and top face of its respective belt. In addition, it is important that the absorbent material have a melt temperature higher than the possible temperature of the belt. In one embodiment, the absorbent material has a melt temperature higher than 350° F. (177° C.), preferably higher than 400° F. (204° C.), and more preferably higher than 450° F. (232° C.).

The absorbent pad 120 is shown in FIG. 1 in contact with the first belt 122 for cleaning. A similar absorbent pad 130 is shown in FIG. 1, in contact with the second belt 24. The absorbent pads 120 and 130 are generally identical, although oriented for mirror image operation with respect to their respective belts 22 and 24.

In one embodiment, the absorbent pad 120 is rotated about its axis 124 to engage different portions thereof (as its contact face) with its respective belt (see, e.g., arrows 132 in FIG. 1). Thus, a clean portion of the outer cylindrical surface of the absorbent pad 120 can be indexed into position to engage the belt for belt cleaning. The cylindrically shaped absorbent pad 128 is not rotated to move its outer surface as the same rate as its belt, but may be indexed periodically (either manually or by a motor or other mechanized means). Once the cylindrically shaped absorbent pad 128 has been completely indexed through an entire rotation about its axis 124, or is otherwise deemed to be fully saturated with liquid, it is replaced with a fresh absorbent pad.

FIGS. 8, 9 and 9A illustrate the absorbent pad 120 borne by a pad housing 136, thereby defining a pad cartridge 137. The housing 136 has an enclosure defined by a cylindrical sidewall 138 and opposed endcaps 139, with a laterally disposed window 140 in the sidewall 138 for exposure of a portion of the absorbent pad 120. As best seen in FIG. 9A, the window 140 is aligned to expose one or more lobes 126 of the absorbent material 128 of the absorbent pad 120. In one embodiment, exposed lobes 126a, 126b and 126c are in engagement with the top face 34 of the belt 22 as it moves past the absorbent material 120. Indexing the cylindrically shaped absorbent material 128 about its axis 124 (in direction of arrows 132) will bring the next lobe 126d into contact with the belt 22, while allowing lobe 126a (now fully saturated with liquid) to be moved out of engagement with the belt. Those lobes in contact with the top face of the belt deform to increase the surface area of absorbent material in contact with the belt face and "wipe" the belt face with absorbent material.

The absorbent pad 120 (or if in cartridge form, the cartridge 138), is supported by suitable structure (not shown) relative to its respective belt. The absorbent pad 120 is removable and replaceable, so that once fully saturated with liquid, a fresh pad can be substituted for the soiled one. The pad may be removable from adjacent the belt, from its housing if one is provided, or it may be replaced in cartridge form (i.e., the pad and housing are removed and replaced together).

As illustrated in FIG. 9, a motor 150 may be rotatably coupled by suitable means to the core 122 of the absorbent pad 120, for rotation thereof relative to the housing 136. Suitable bearings 152 may be provided to facilitate such rotation. The motor can thus be activated periodically to rotate the absorbent pad 120 and sequentially present fresh absorbent material to the belt. In another embodiment, the core is formed as a hollow tube 153 which is perforated (as at 154). The hollow tube 153 is sealed at one end, while at its other end it is coupled to a liquid evacuation system 155 having a pump 156 and liquid collector 158. Thus, absorption of liquid from the belt is aided by drawing a vacuum through the absorbent material to draw liquid from its outer edges to the core (a hollow tube) and then out of the core to be collected. Alternatively, removal of the liquid from the core is accomplished via mechanical means such as a screw auger, piston drive or other fluid conveyance mechanism, alone or in combination with a vacuum draw. In addition, the axis of the core can be tilted relative to horizontal to aid in liquid drainage toward its lower end, and removal therefrom.

In one embodiment, means are provided for sensing when the absorbent pad is fully saturated with liquid, and thus needs removal for cleaning or replacement. Such sensing means may simply be a timer based upon usage, indicating a presumed degree of liquid saturation over time of operation, a sensor based on linear exposure of the belt to the absorbent material, or a weight based sensor, detecting the change in weight of the absorbent pad as it becomes saturated with liquid. In another embodiment, the sensor may be an optical sensor 160 mounted, for example, on the core. The optical sensor 160 may be aligned to be directed radially outwardly from the core, to detect the change in opacity of the absorbent material as it becomes saturated with liquid (the absorbent material becomes less opaque as it becomes more saturated). The sensor may also be used to detect partial saturation, and thus provide a signal (e.g., to the motor 15) to facilitate indexed advance of the absorbent material relative to the belt.

Figure 10:
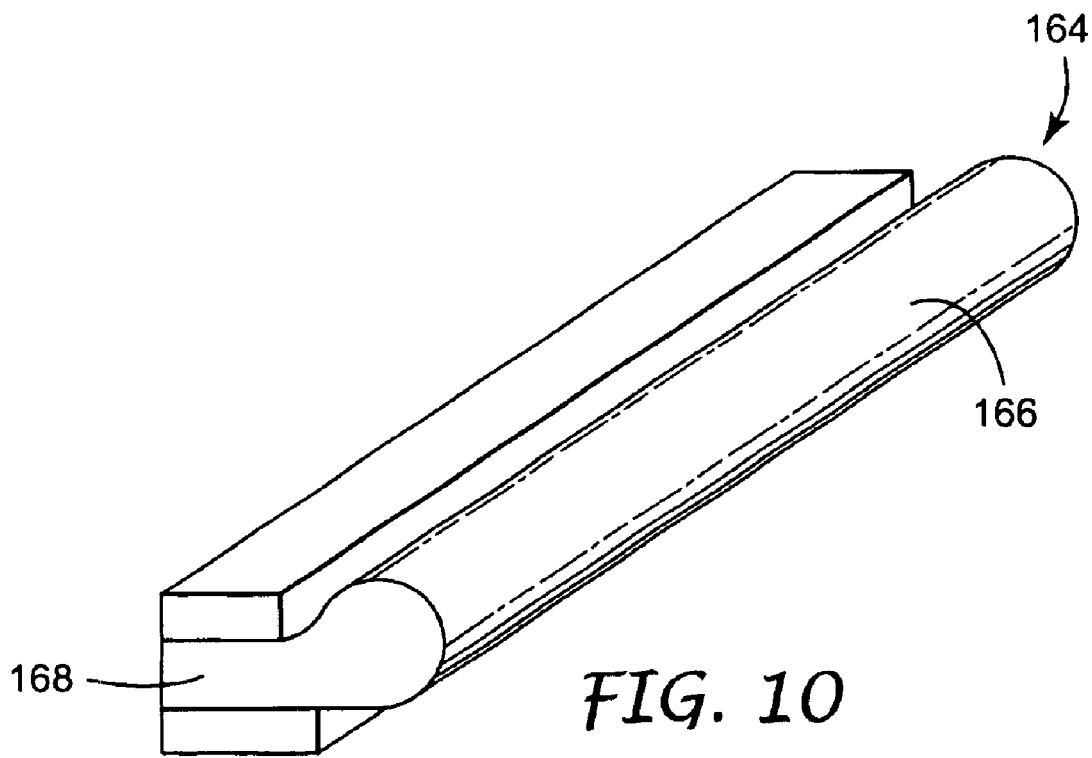
FIG. 10 is a perspective view of an alternative embodiment of the belt cleaning absorbent material pad of the present invention.

FIG. 10 illustrates an alternative absorbent pad design 164. The alternate pad design 164 is aligned to present a single lateral pad surface 166 of absorbent material 168 to a passing belt. The absorbent pad 164 is not indexable relative to the belt, and once the absorbent material 168 is fully saturated with liquid, the absorbent pad 164 is simply replaced, or removed for cleaning and reuse. The pad surface 166 is positioned by suitable structure (not shown) relative to the face of its respective belt to be engaged so that it deflects against it to present the largest, possible surface area, and thereby "wipe" the face of the belt while absorbing liquids therefrom.

As illustrated by phantom absorbent pads 162 in FIG. 1, absorbent material may be disposed to wipe against the bottom faces 36 and 40 of the belts 22 and 24, thereby removing by absorption any residual liquid thereon (that may have migrated to the bottom face during processing from the top face of the belt).

Figure 11:
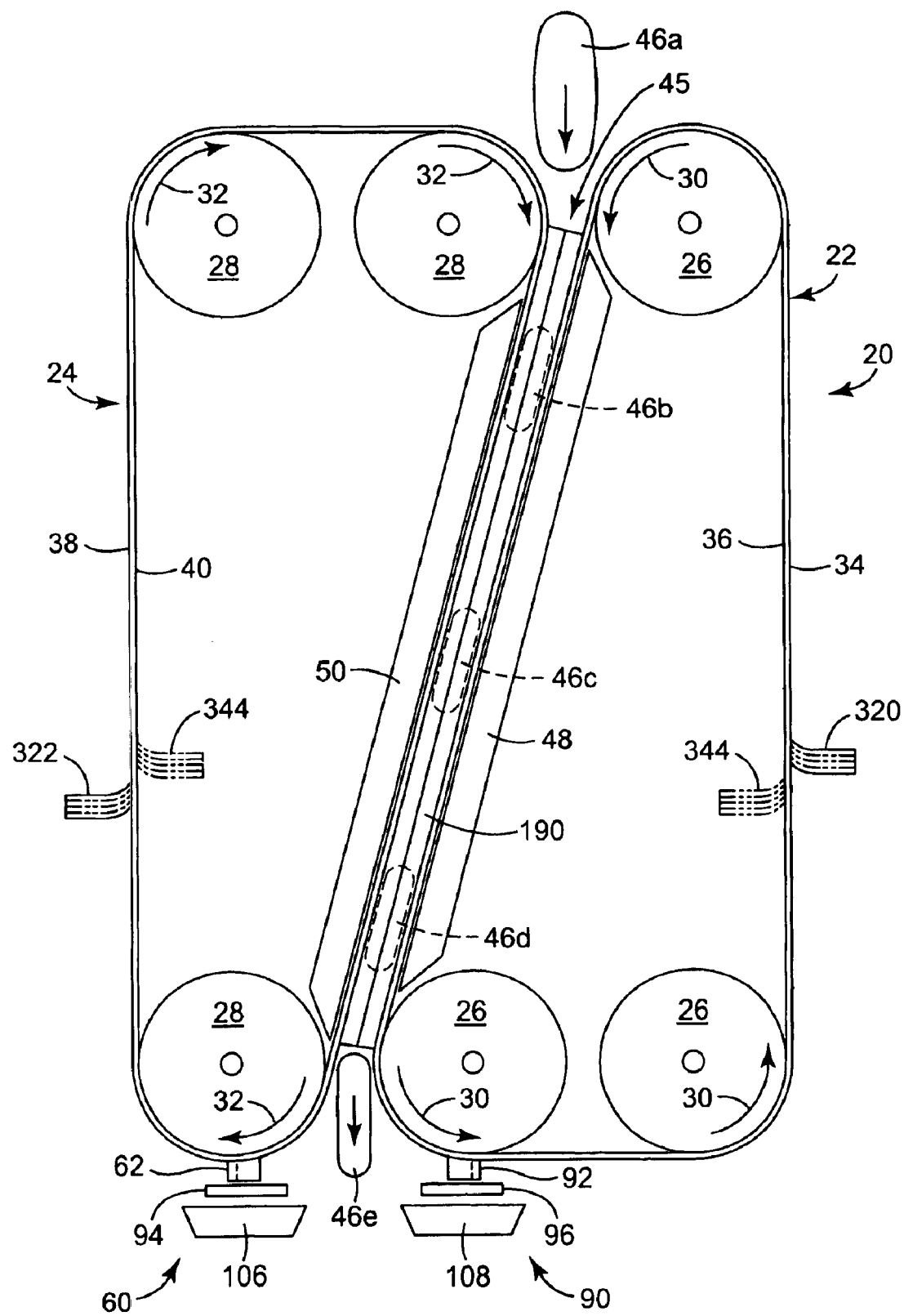
FIG. 11 is a schematic illustration of a conveyor belt system having another alternative embodiment of the inventive cleaning assembly thereon.

FIG. 11 illustrates the article conveying system 20 including another alternative absorbent pad design, which comprises an absorbent pad unit 320 located along the top face 34 of belt 22. Absorbent pad unit 320 may be located almost anywhere along belt 22, with the particular location chosen as a matter of convenience and available space. In one embodiment, for example, the absorbent pad unit 320 is attached to the belt wiping blade assembly 90. In a preferred embodiment, the absorbent pad unit 320 is located along an outer vertical segment of the belt 22. It is further desirable to locate the absorbent pad unit 320 at the hottest possible location so that grease on the belt 22 is at its most soluble, for example, by locating the absorbent pad unit 320 close to the roller 26 at the bottom of the outer vertical segment of the belt 22. A mirror image absorbent pad unit 322 is located along the belt 24, in the same manner as for absorbent pad unit 320.

Figure 12:
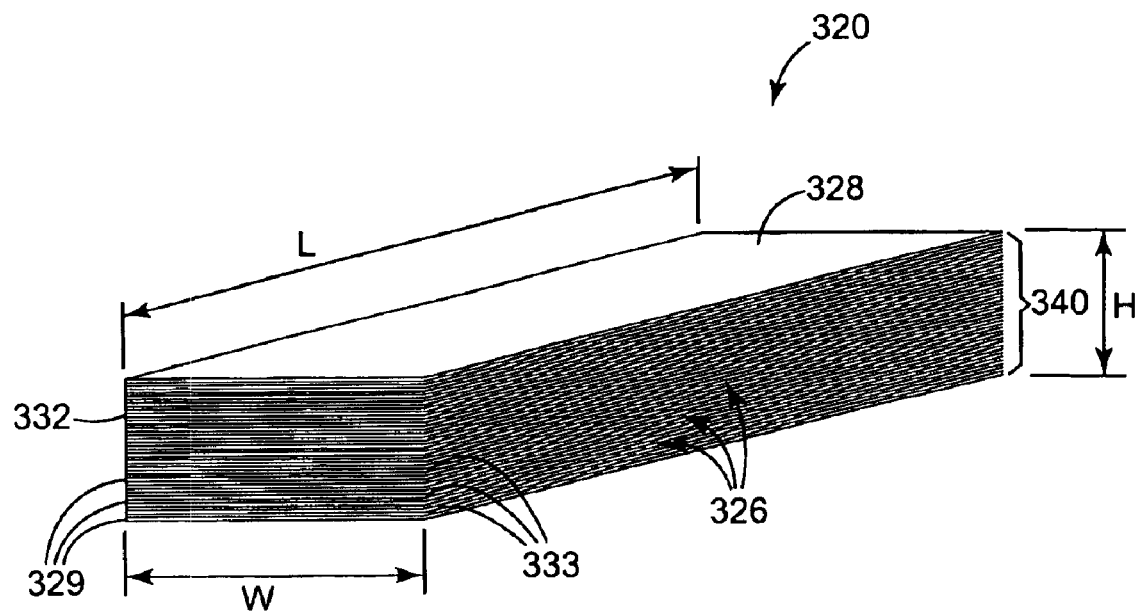
FIG. 12 is a perspective view of another alternative embodiment the absorbent material pad unit of the present invention.

As seen in FIG. 12, an alternative pad unit 320 comprises a plurality of individual sheets 326 of liquid absorbent material 328 laterally disposed in a stack. In one embodiment, the sheets are horizontally disposed and the stack is vertically disposed. The individual sheets 326 are bonded together along first edges 329 of each of the sheets 326, along a first face 332 of absorbent pad unit 320. A second contact face 340 is defined by the opposite second edges 333 of the sheets 326. In operation, the contact face 340 engages the top face 34 of the belt 22. In one embodiment, the absorbent pad unit 320 is not indexable relative to the belt, and once the absorbent material 328 is fully saturated with liquid from the belt 22, the absorbent pad unit 320 is simply replaced, or removed for cleaning and reuse.

The absorbent material 328 may be any of the types described with respect to the previous embodiments. In a preferred embodiment, the absorbent material 328 is spunbond polyethylene terephthalate (PET). The individual sheets 326 are also generally about 20–30 mils (0.5080–0.7620 mm) thick. In a preferred embodiment, each sheet 326 is about 22 mils (0.5588 mm) thick.

In one embodiment, the absorbent pad unit 320 has a height H of 0.5 inches (1.27 cm), a length L of 7.75 inches (19.685 cm), and a width W of 1.0 inches (2.54 cm). In another embodiment, the absorbent pad unit 320 has a height H of 0.5 inches (1.27 cm), a length L of 6.75 inches (17.145 cm), and a width W of 1.0 inches (2.54 cm). In order to achieve a height H of 0.5 inches (1.1.27 cm), when individual sheets 326 are of 22 mils (0.5588 mm) thickness, the absorbent pad unit 320 typically comprises about 38–40 individual sheets 326.

Figure 13:
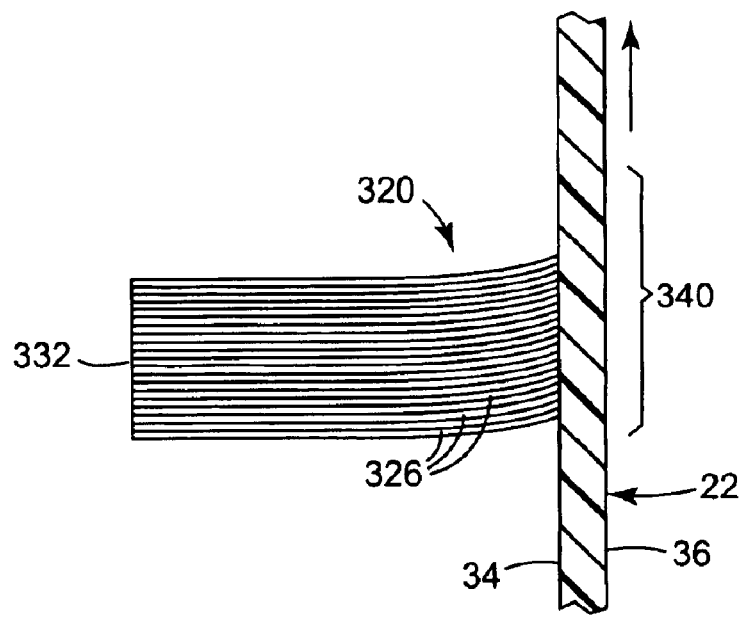
FIG. 13 is an enlarged longitudinal section through the absorbent material pad unit of FIG. 12 and its associated belt, aligned for engagement and operation.

FIG. 13 illustrates the absorbent pad unit 320 positioned relative the belt 22. The absorbent pad unit 320 is typically positioned perpendicular to the belt 22. The absorbent pad unit 320 is positioned such that one or more individual sheets 326 deflect against ("wipe") the top face 34 of the belt 22. The absorbent pad unit 320 is loaded in tension relative to the top face 34 of the belt 22, as the contact face 340 of the absorbent pad unit 320 maintains intimate contact with the top face 34 of the belt 22, generally causing two or more of the individual sheets 326 to fan apart at or near the contact face 340. For example, the absorbent pad unit 320 may have one-sixteenth inch (0.15875 cm) deflection spacing, meaning the contact face 340 would extend one-sixteenth of an inch (0.15875 cm) beyond the top surface 34 of the belt 22 if not for deflection of the sheets 326 of the absorbent pad unit 320 caused by contact with the top surface 34 of the belt 22.

The first edges 329 of the individual sheets 326 may be bonded together using any suitable technique, including: the use of adhesives; potting; thermal bonding such as roll, plate, wire, ultrasonic, induction or other thermal bonding techniques; or mechanically clamping or retaining the sheets 326 together. Bonding the individual sheets 326 at the first face 332 prevents individual sheets 326 from separating from the absorbent pad unit 320 as the sheets 326 fan apart near the second contact face 340.

In one embodiment, means are provided for sensing when the absorbent pad unit 320 is fully saturated with liquid, and thus needs removal for cleaning or replacement. Such sensing means may simply be a timer based upon time of usage, indicating a presumed degree of liquid saturation over time of operation, a sensor based on linear exposure of the belt 22 to the absorbent material 328, or a weight based sensor, detecting the change in weight of the absorbent pad 320 as it becomes saturated with liquid. In another embodiment, the sensor may be an optical sensor (not shown) mounted, for example, adjacent the pad 320. The optical sensor may be configured to detect the change in opacity of the absorbent material (as it becomes more saturated).

As illustrated by phantom absorbent pad units 344 in FIG. 11, an absorbent material pad unit, comprising individual sheets of absorbent material, may be disposed to engage (i.e., wipe against) the bottom faces 36 and 40 of the belts 22 and 24. Absorbent pads may be arranged nearly anywhere along the bottom faces 36 and 40 of the belts 22 and 24, with the particular location chosen as a matter of convenience and available space. Typically, absorbent pad units 344 are located near absorbent pad units 320 and 322, respectively. In further embodiments, performance may be enhanced when support is provided to the belts 22 and 24 directly opposite the absorbent pad units 320 and 322, respectively, such as where absorbent pad units 344 are positioned directly opposite absorbent pad units 320 and 322 on either sides of the respective belts 22 and 24.

Figure 14:
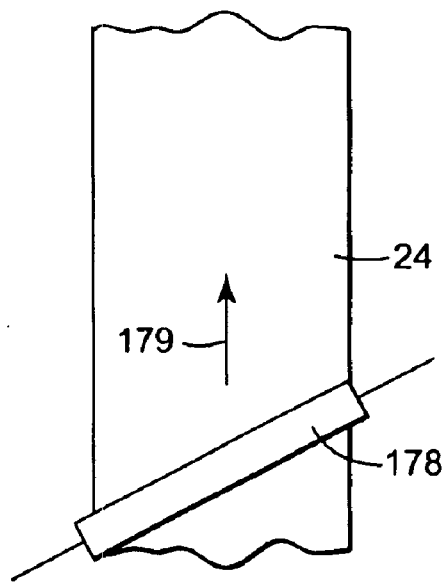
FIG. 14 is a schematic illustration of an absorbent material pad aligned at a tilted angle relative to the belt engaged by the absorbent material pad.

In order to increase the amount of absorbent material exposed to the belt face, the absorbent material may be tilted relative to the belt travel direction (see, e.g., FIG. 14). Accordingly, the absorbent material (whether in the form 128 shown in FIGS. 1 and 7–9A, in the form 168 shown in FIG. 10, in the form 320 shown in FIGS. 11–13, or in some other functionally equivalent form) is disposed as at 178 in FIG. 14, relative to a belt such as belt 24. The direction of belt travel is indicated by arrow 179. As seen, absorbent material 178 is tilted relative to the belt 24 (i.e., tilted relative to horizontal). Thus, the absorbent material can be longer than the lateral width of the belt, and thereby present a greater surface area to the belt face which passes by the absorbent material.

Belt Edge Seals

As noted above, it is undesirable that liquid and/or debris migrate from the top face of a belt to its edges or to its bottom face. The inventive cleaning assembly thus includes edge seals for placement between the opposed belts along the article transport path. The edge seals serve as a physical barrier to contain liquids and debris from reaching the lateral side edges of the belts. As seen in FIG. 1A, the first belt 22 has lateral side edges 180 and 182, while the second belt 24, as shown in FIG. 2, has lateral side edges 64 and 66. Along the article transport path 45, the opposed top faces 34 and 38 of the belts 22 and 24 are spaced apart by a distance "d". A first resilient edge seal 190 is disposed across the space "d" adjacent the lateral side edges 180 and 64, while a second resilient edge seal 192 is disposed adjacent opposed lateral side edges 182 and 66.

Figure 15:
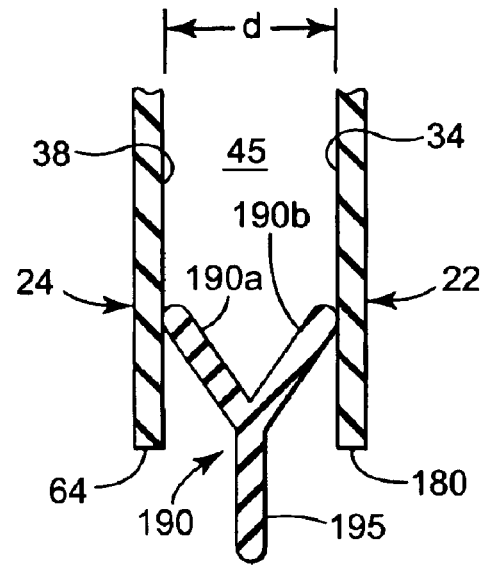
FIG. 15 is an enlarged view of the portion of FIG. 1A indicated by the dashed outline 11, showing one of the belt seals.

In one embodiment (see, e.g., FIGS. 14 and 15), each wedge seal is y-shaped, and has longitudinally extending legs or fins reiliently urged outwardly against the top faces of the opposed belts. Edge seal 190 has legs 190*a* and 190*b*, while edge seal 192 has legs 192*a* and 192*b*. The distal end of each leg or fin is rounded for smooth engagement with the top face of its respective belt. A center dorsal fin 195 (series of tabs) is provided on edge seal 190 for ease of manipulation, mounting and handling thereof. Edge seal 192 likewise has a center dorsal fin 197. The edge seals thus prevents liquid from moving to the lateral side edges of the belts, and further from moving to the bottom side of each belt. In addition, gasses (such as steam) that may be generated during processing of the article along the article transport path between the belts can be contained by the edge seals and diverted to an appropriate exhaust path.

Figure 16:
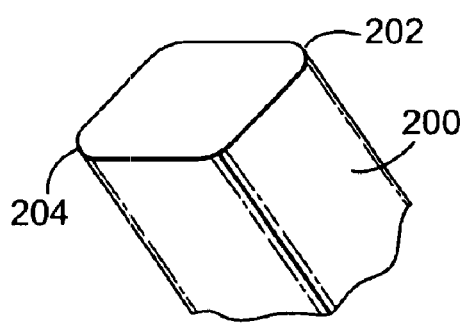
FIG. 16 is a perspective view of a portion of an alternative design for the belt seal.
Figure 17:
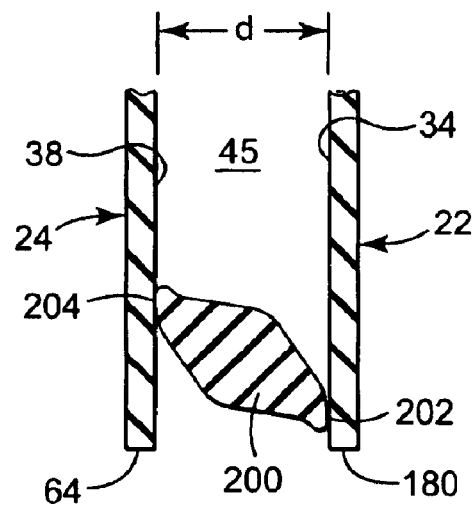
FIG. 17 is a partial sectional view showing the belt seal of FIG. 16 disposed between the opposed faces of the belts.
Figure 18:
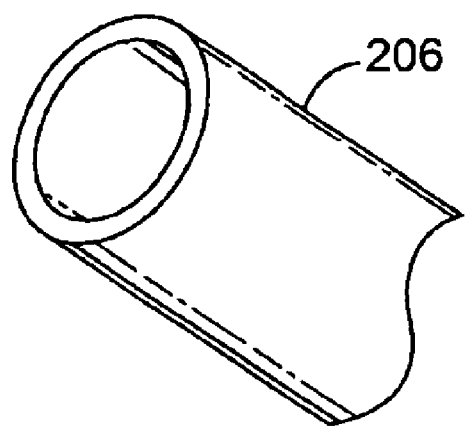
FIG. 18 is a perspective view of a portion of an alternative designed for the belt seal.
Figure 19:
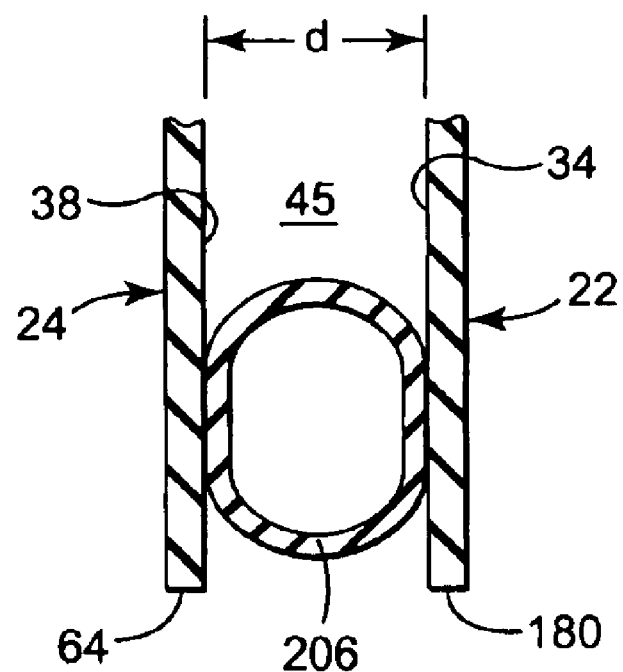
FIG. 19 is a partial sectional view showing the belt seal of FIG. 14 disposed between the opposed faces of the belts.

In an alternative embodiment (see, e.g., FIGS. 16 and 17), the edge seal is an elongate compressible solid member 200, having opposed belt engagement edges 202 and 204. The solid number 200 is resilient and is inserted (by twisting and/or compression thereof) between the opposed belts 22 and 24, as seen in FIG. 17, with its edge 202 and 204 pressed against the top faces 34 and 38 of the belts. In another alternative embodiment of the edge seal (see, e.g., FIGS. 18 and 19), the edge seal is hollow elongated tubular member 206. The tubular member 206 is resilient and is inserted between the opposed belts 22 and 24. It deforms to fit the gap "d" therebetween and form a seal as it is presses against the top faces 34 and 38 of each belt. It is cintemplated that a solid member 200 and tubular member 206 will be mounted at their ends relative to the article conveying systems.

In one embodiment, the edge seals are formed from, for example, a polyester or nylon material which is softer than the belts, so that scratching of the belts does not occur during use. In all embodiments of the edge seal, the material forming the seal is resilient enough to accommodate changes in dimension "d" along the article transport path. The edge seals are flexible, resilient and non-absorbing of liquids. In addition, it is important that the edge seals have a melting temperature higher than the possible temperature of the belt. In on embodiment, the belt seal have a melt temperature higher than 350° F. (177° C.), preferably higher than 400° F. (204° C.), and more preferably higher than 450° F. (232° C.). The edge seals are easily replaceable when worn or for access to the article transport path between the opposed belts.

Although the present invention has been described with reference to preferred embodiments, workers skilled in the art will recognize that changes may be made in form and detail without departing from the spirit and scope of the invention.

What is claimed is:

1. A cleaning assembly for removing liquids from an endless conveyor belt, the assembly comprising:
   a plurality of laterally extending liquid absorbent material sheets disposed adjacent the belt, with the sheets collectively defining a contact face that is engageable with the belt for wiping liquids and solids from the belt.

2. The cleaning assembly of claim 1, wherein the plurality of sheets are substantially vertically aligned in a stack.

3. The cleaning assembly of claim 2, wherein the plurality of sheets are affixed together along a first face of the stack that is disposed opposite the contact face.

4. The cleaning assembly of claim 1, wherein the absorbent material is selected from the group consisting of a nonwoven material, a woven material, and a knit material, or combinations thereof.

5. The cleaning assembly of claim 1, wherein the absorbent material has a melt temperature greater than 350° F. (177° C.).

6. The cleaning assembly of claim 1, and further comprising:
   a sensor for generating a signal indicative of the degree of liquid saturation of the absorbent material.

7. The cleaning assembly of claim 6, wherein the sensor detects the change in weight of the absorbent material over time.

8. The cleaning assembly of claim 6, wherein the sensor detects the change in opacity of the absorbent material over time.

9. The cleaning assembly of claim 1, wherein the absorbent material has one or more of the following characteristics: oleophilic, hydrophilic, or a combination thereof.

10. The cleaning assembly of claim 1, wherein the absorbent material is spunbond PET.

11. The cleaning assembly of claim 1, wherein the sheets are disposed substantially perpendicular to the belt, and disposed relative the belt at a distance such that at least one of the individual sheets to deflects due to contact with the belt.

12. A cleaning assembly for removing liquids from an endless conveyor belt, the assembly comprising:
   a liquid absorbent material unit disposed adjacent the belt, wherein the absorbent material unit comprises a stack of laterally extending sheets of absorbent material affixed together at first edges of each of the sheets, wherein at opposite second edges the sheets collectively define a contact face on the absorbent material unit that is engageable with the belt for wiping liquids and solids from the belt, and wherein at least one of the sheets deflects when engaged with the belt.

13. The cleaning assembly of claim 12, wherein the absorbent material is selected from the group consisting of a nonwoven material, a woven material, and a knit material, or combinations thereof.

14. The cleaning assembly of claim 12, wherein the absorbent material has a melt temperature greater than 350° F. (177° C.).

15. The cleaning assembly of claim 12, and further comprising:
   a sensor for generating a signal indicative of the degree of liquid saturation of the absorbent material.

16. The cleaning assembly of claim 15, wherein the sensor detects the change in weight of the absorbent material over time.

17. The cleaning assembly of claim 15, wherein the sensor detects the change in opacity of the absorbent material over time.

18. The cleaning assembly of claim 12, wherein the absorbent material has one or more of the following characteristics: oleophilic, hydrophilic, or a combination thereof.

19. The cleaning assembly of claim 12, wherein the absorbent material is spunbond PET.

20. A method for removing liquids from an endless conveyor belt, the method comprising:
   advancing the belt; and
   engaging the belt with a contact face of a liquid absorbent material unit disposed adjacent the belt, wherein the absorbent material unit comprises a stack of laterally extending sheets of absorbent material affixed together at first edges of each of the sheets, wherein at opposite second edges the sheets collectively define the contact face of the absorbent material unit, and wherein at least one of the sheets deflects when engaged with the belt.

21. The method of claim 20, and further comprising:
   periodically replacing the liquid absorbent unit relative to the belt.

* * * * *

UNITED STATES PATENT AND TRADEMARK OFFICE
CERTIFICATE OF CORRECTION

PATENT NO. : 7,114,610 B2
APPLICATION NO. : 10/850323
DATED : October 3, 2006
INVENTOR(S) : Lance E. Behymer It is certified that error appears in the above-identified patent and that said Letters Patent is hereby corrected as shown below:

Column 2
Page 2, (Foreign Patent Documents), Line 7 - Delete "WO 01/265527" and insert -- WO 01/26527 --, therefor

Column 10
Line 34, Delete "wedge" and insert -- edge --, therefor.
Line 35, Delete "reiliently" and insert -- resiliently --, therefor.
Line 39, Delete "(series" and insert -- (or series--, therefor
Line 43, Delete "prevents" and insert -- prevent --, therefor
Line 52, Delete "number" and insert --member--, therefor
Line 54, Delete "edge" and insert -- edges--, therefor
Line 57, After "is" insert -- a --.
Line 60, Delete "presses" and insert -- pressed --, therefor.
Line 61, Delete "cintemplated" and insert -- contemplated --, therefor
Line 62, Before "solid" delete "a".
Line 64, Delete "systems." and insert -- system. --, therefor.

Column 11
Line 7, After "In" delete "on" and insert -- one --, therefor.
Line 7, Delete "seal" and insert -- seals --, therefor.

Signed and Sealed this

Sixth Day of March, 2007

JON W. DUDAS
*Director of the United States Patent and Trademark Office*